Feb. 1, 1966  E. RASMUSSEN  3,232,419
APPARATUS FOR CONVEYING FINELY DIVIDED MATERIAL
Filed July 10, 1963  2 Sheets-Sheet 1

INVENTOR.
Enok Rasmussen
BY
Pennie Edmonds Morton Taylor Adams
Attorneys

Feb. 1, 1966  E. RASMUSSEN  3,232,419
APPARATUS FOR CONVEYING FINELY DIVIDED MATERIAL
Filed July 10, 1963  2 Sheets-Sheet 2
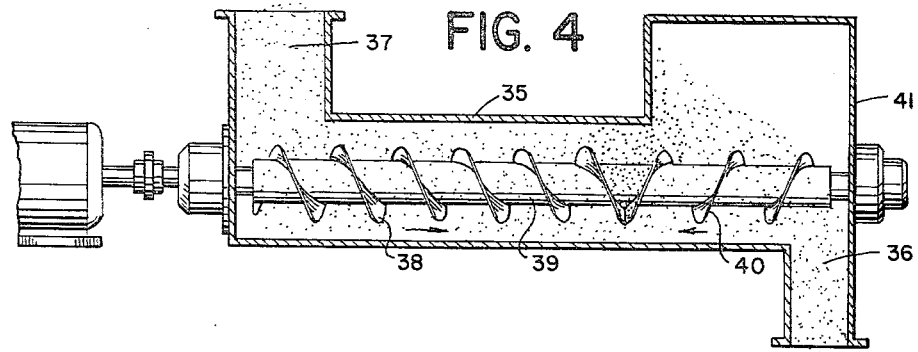
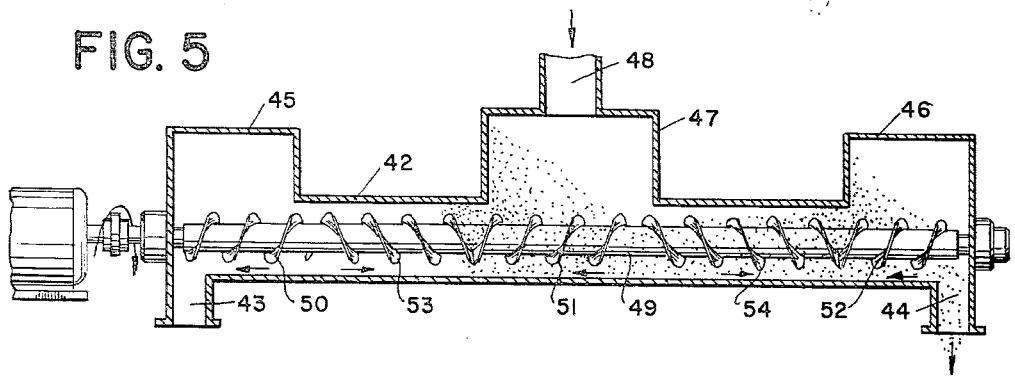
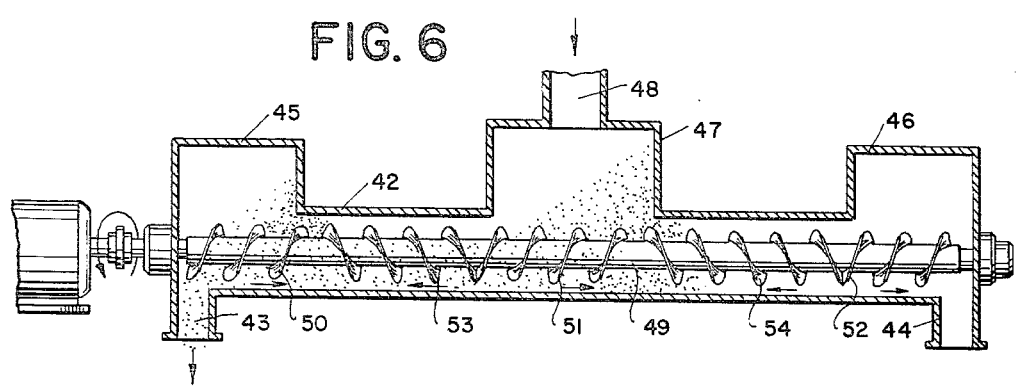
INVENTOR.
Erok Rasmussen
BY

United States Patent Office 3,232,419
Patented Feb. 1, 1966

3,232,419
APPARATUS FOR CONVEYING FINELY
DIVIDED MATERIAL
Enok Rasmussen, Copenhagen-Valby, Denmark, assignor
to F. L. Smidth & Co., New York, N.Y., a corporation
of Delaware
Filed July 10, 1963, Ser. No. 293,990
Claims priority, application Great Britain, July 16, 1962,
27,262/62
7 Claims. (Cl. 198—217)

This invention relates to the conveying of finely divided material and is concerned more particularly with a novel method of conveying such material from a region at one pressure to a region at a different pressure without loss of pressure from a region of super-atmospheric pressure or admission of air into a region of sub-atmospheric pressure. The invention also includes novel apparatus for practicing the method.

The method of the invention may be employed to advantage in the feeding of material into or withdrawing it from a grinding circuit comprising a mill, a separator, and a filter, in all of which the pressure is sub-atmospheric, where it is important to avoid the admission of atmospheric air into the circuit. Another application of the method makes it possible to avoid loss of pressure from a pneumatic conveyor, in which the pressure is above atmospheric, when material is being fed into the conveyor. The method of conveying of the invention solves these problems effectively and can be practiced with simple apparatus.

The simplest form of apparatus for carrying on the method of the invention includes a casing having an inlet open to a region of one pressure and an outlet open to a region of a different pressure. A shaft within the casing extends from the inlet to the outlet and carries a screw impeller for advancing material through the casing from the inlet toward the outlet. A chamber is disposed above an opening in the top of the casing between the inlet and the outlet and the shaft carries a screw impeller within the casing beneath the chamber, which is of a hand opposite to the hand of the first screw impeller. In the operation of the apparatus, the second impeller resists the movement of the material through the casing by the first impeller and causes the material to back up and form a pile extending upward from the casing into the chamber and having an inclined surface down which the material slides toward the outlet. The pile of material forms a seal for the casing at the upstream side of the chamber and the material, which slides down the surface of the pile, either flows by gravity to the outlet or is advanced to the outlet by another screw impeller on the shaft. The seal prevents flow of gas through the casing from one region to the other and the chamber is closed so that flow of gas into or out of the casing is prevented.

The new apparatus may have more than one inlet and more than one outlet but, in all forms, is provided with a chamber and screw impellers for producing a pile of material sealing the conveyor casing wherever necessary for preventing transmission of pressure between regions of different pressures.

For a better understanding of the invention, reference may be made to the accompanying drawings, in which FIG. 1 is a vertical longitudinal sectional view of one form of apparatus for practicing the method of the invention;

FIGS. 3 and 4 are vertical longitudinal sectional views of modified forms of the apparatus;

FIG. 5 is a vertical longitudinal sectional view of another modified view of the apparatus; and FIG. 6 is a view like FIG. 5 showing the conditions in the apparatus when the direction of rotation of the shaft is reversed.

Figure 1:
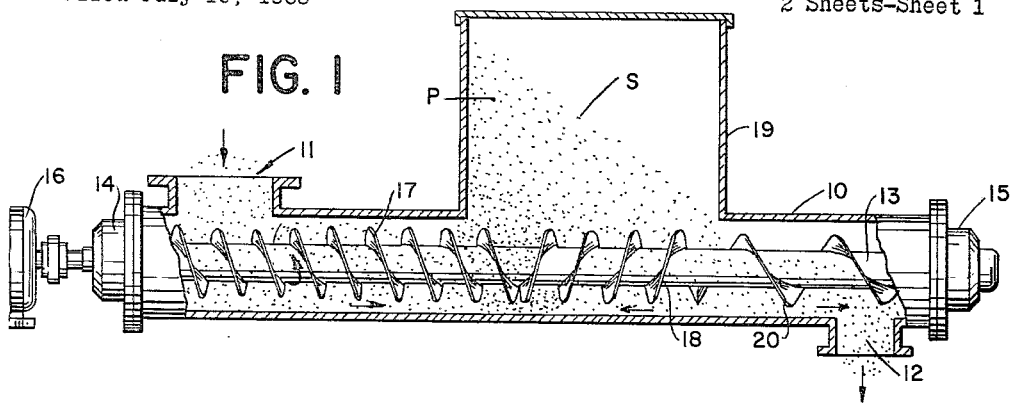
Figure 2:
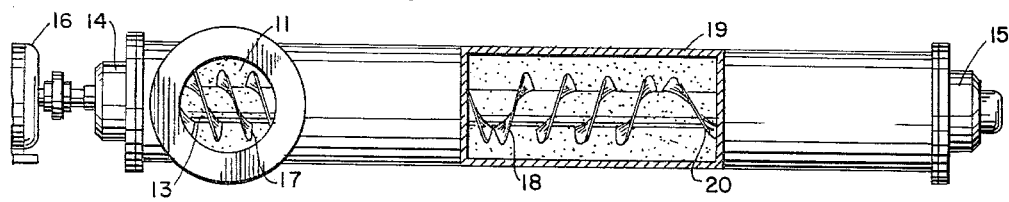
FIG. 2 is a plan view of the apparatus with a part broken away.

The apparatus shown in FIG. 1 includes a casing 10 having an inlet 11 open to the region of one pressure and an outlet 12 open to the region of a different pressure. A shaft 13 mounted for rotation on bearings 14, 15 extends through the casing from the inlet to the outlet and is driven by a motor 16. The shaft carries a screw impeller 17, which operates to advance material from the inlet toward the outlet, when the shaft is rotated counter-clockwise as viewed from the left end of casing, and, beyond the screw impeller 17, the shaft carries a second screw impeller 18 of a hand opposite to the hand of the impeller 16. The top of the casing is cut away above the impeller 18 and a chamber 19 overlies the opening and is closed at its top. Beyond the impeller 18, the shaft 13 carries a third screw impeller 20 of the same hand as the impeller 17 and of coarser pitch than the impellers 17, 18.

In the operation of the conveyor of FIG. 1, the finely divided material entering the casing through the inlet is advanced by the impeller 17, until it reaches the impeller 18, which resists its further movement. As a result, the material backs up and rises out of the casing into the chamber to form a pile P having a surface S inclined to the vertical at the angle of repose of the material. As the conveying proceeds, material backed up into the pile slides down the inclined surface to return to the casing and be advanced to the outlet by the impeller 20. The pile of material in the chamber at the upstream side of the chamber forms a seal for the casing and the volume of the pile remains constant, since, as material slides down the surface S, an equal amount of material is forced upwardly into the pile.

Figure 3:
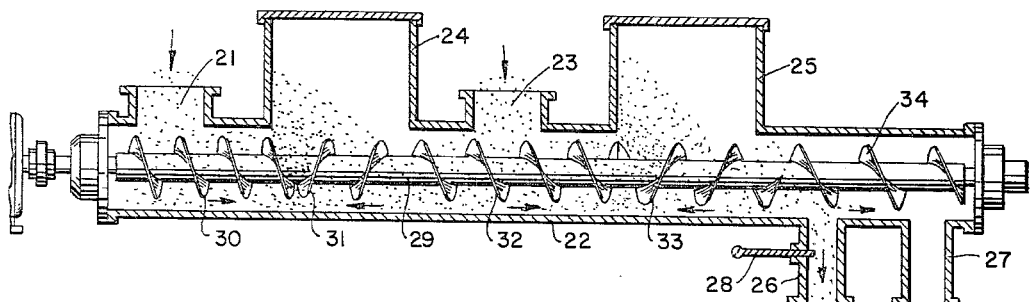

The conveyor shown in FIG. 3 has an inlet 21 at one end of the casing 22 and a second inlet 23 spaced along the casing from the first. The casing has an opening between the inlets, above which is mounted a closed chamber 24, and a similar opening and chamber 25 on the downstream side of the second inlet. Beyond the chamber 25, the casing has two outlets 26, 27, of which the outlet 26 is closable by a valve 28. Within the casing, a shaft 29 extends from the first inlet to the second outlet and the shaft carries a screw impeller 30 for advancing material from the inlet 21 toward the outlets, and a screw impeller 31 for backing up material to form a pile in the chamber 24 sealing the casing at the upstream side of the chamber 24. A screw impeller 32 on the shaft 29 advances the material, which has slid down the pile in chamber 24, past the inlet 23 to the chamber 25, where a screw impeller 33 on the shaft backs up the material to form a pile in the chamber 25, which seals the casing at the upstream side of the chamber. Beyond the chamber 25, the material is advanced to the outlets by an impeller 34 on the shaft.

In the operation of the conveyor of FIG. 3, material entering the casing through either inlet may be discharged through either outlet by manipulation of the valve 28. If the material enters the casing through the inlet 21, a seal of the material is formed at the upstream side of both chambers 24, 25, while a seal is formed only at the upstream side of chamber 25, if the material enters through the inlet 23.

The conveyor shown in FIG. 4 is generally the same as that shown in FIG. 1 except that the opening in the top of the casing 35 lies partly above the outlet 36. The material entering the casing through the inlet 37 is advanced toward the outlet by a screw impeller 38 on the shaft 39 and the material is backed up by a screw impeller 40 on the shaft to form a pile in a chamber 41 closing the opening. As the opening lies partly above the outlet, the material sliding down the inclined surface of the pile moves by gravity to the outlet. The pile of material seals the casing at the upstream side of the chamber.

The conveyor shown in FIGS. 5 and 6 includes a casing 42 having outlets 43, 44 at opposite ends. The casing has an opening in its top above each outlet and the openings are closed by chambers 45, 46. The casing has another opening in its top between its ends, above which is disposed a chamber 47 provided at its top with a material inlet 48. A shaft 49 extending from one outlet to the other carries five screw impellers, of which the impellers 50, 51, and 52 beneath the chambers 45, 47 and 46, respectively, are of the same hand, and the impellers 53, 54 are of a hand opposite to that of impellers 50, 51 and 52.

In the operation of the conveyor of FIGS. 5 and 6 with the shaft rotating counter-clockwise as viewed from the left (FIG. 5), the material entering the casing 42 from the inlet 48 through the chamber 47 is advanced toward the outlet 43 by the impeller 51 and the material is backed up in the chamber 47 by the impeller 53 to form a pile in the chamber 47 sealing the casing at the side toward the impeller 53. Material which has slid down the inclined surface of the chamber 47 is advanced by the impeller 54 and backed up by the impeller 52 to form a pile in chamber 46 sealing the casing at the upstream side of the chamber. Material sliding down the inclined surface of the pile in chamber 46 passes out through the outlet 44.

When the shaft 49 in the conveyor is rotated clockwise as viewed from the left (FIG. 6), the casing 42 is sealed by a pile of material in the chamber 47 at the side toward the impeller 54 and material sliding down the inclined surface of the pile is advanced toward the outlet 43 by the impeller 53. The impeller 50 backs up material in the chamber 45 to form a pile sealing the casing and material sliding down the inclined surface of the pile passes out through the outlet 43.

I claim:

1. A screw conveyor comprising a casing having an inlet open to a region at one pressure and an outlet open to a region at a different pressure, a shaft extending through the casing from the inlet to the outlet, a screw impeller on the shaft for advancing material through the casing from the inlet toward the outlet, means defining a chamber above and open to the casing between the inlet and the outlet, and a screw impeller on the shaft below the chamber and of a hand opposite to that of the first impeller for backing up the material to form a pile of material in the chamber sealing the casing at the upstream side of the chamber and having an inclined surface down which the material slides into the casing near the downstream side of the chamber.

2. The screw conveyor of claim 1, in which the chamber overlies the casing just before and above the outlet.

3. The screw conveyor of claim 1, in which the chamber lies spaced from both the inlet and the outlet and a screw impeller of a hand opposite to that of the impeller below the chamber is mounted on the shaft to advance through the casing to the outlet the material which has slid down the surface of the pile.

4. The screw conveyor of claim 1, in which the casing has a second inlet spaced from the first and a second outlet spaced from the first, the chamber is open to the casing between the inlets, means are provided for defining a second chamber above and open to the casing, the second chamber lying between the inlets and the nearer outlet, the impeller for backing up material produces a pile of the material in the chamber between the inlets, the shaft carries another impeller for backing up the material and forming a pile of the material in the chamber between the inlets and the nearer outlet, the pile sealing the casing between the inlets and the nearer outlet, the shaft carries an impeller for advancing material through the casing from the chamber between the inlets to the other chamber and an impeller for advancing material through the casing from the other chamber to the outlets, and means are provided for closing the outlet nearer the inlets.

5. The screw conveyor of claim 1, in which the casing has an outlet at each end, a closed chamber open to the casing above each outlet, a middle closed chamber above and open to the casing between the outlets, and an inlet into the middle chamber, the shaft carries a screw impeller between the inlet and the second outlet for advancing material through the casing from the inlet toward the second outlet, and the shaft also carries a screw impeller in the casing beneath each chamber above an outlet, the impellers beneath the chambers being effective alternately as the shaft is rotated in opposite directions to back up material within the respective chambers to form piles of material forming seals for the casing at the upstream sides of the chambers.

6. A screw conveyor comprising a casing having an inlet open to a region at one pressure and an outlet open to a region at another pressure, a shaft extending through the casing from the inlet to the outlet, a chamber above and open to the casing at a distance from both the inlet and the outlet, a screw impeller on the shaft for advancing material from the inlet toward the outlet, a second screw impeller on the shaft beneath the chamber and of a hand opposite to that of the first impeller and effective to create a pile of the material in the chamber sealing the casing at the upstream side of the chamber, and a third screw impeller on the shaft beyond the second screw impeller for advancing material toward the outlet and of the same hand as the first screw impeller.

7. The screw conveyor of claim 6, in which the third screw impeller is of coarser pitch than the second screw impeller.

References Cited by the Examiner

UNITED STATES PATENTS

| | | | |
|---|---|---|---|
| 1,852,525 | 4/1932 | Kemmer | 214—17.4 |
| 2,698,789 | 1/1955 | Segl | 214—17.4 X |
| 2,865,519 | 12/1958 | Wessollek | 214—17.4 |
| 2,884,145 | 4/1959 | Muller et al. | 214—17.4 |
| 3,021,202 | 2/1962 | Peirce et al. | 214—17.4 X |

SAMUEL F. COLEMAN, *Primary Examiner.*